Figure 1:
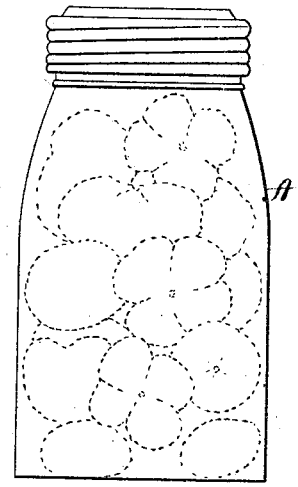
Figure 2:
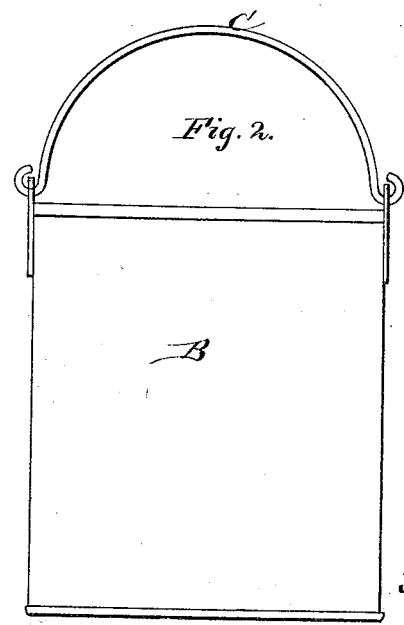

F. G. FORD.

Improvement in Preserving Tomatoes.

No. 132,272.  Patented Oct. 15, 1872.

Witness:
Henry N. Miller
C. L. Evert

Inventor.
Frederic G. Ford.
per
Alexander Mason
Attorneys.

UNITED STATES PATENT OFFICE.

FREDERIC G. FORD, OF BRIDGETON, NEW JERSEY.

IMPROVEMENT IN PRESERVING TOMATOES.

Specification forming part of Letters Patent No. 132,272, dated October 15, 1872.

*To all whom it may concern:*

Be it known that I, FREDERIC G. FORD, of Bridgeton, in the county of Cumberland and in the State of New Jersey, have invented certain new and useful Improvements in Process for Preserving Whole Tomatoes; and do hereby declare that the following is a full, clear, and exact description thereof, reference being had to the accompanying drawing and to the letters of reference marked thereon making a part of this specification.

The object of my invention is to preserve tomatoes whole, so as to have them for use to slice and eat raw in the winter season, or to be cooked in any desired manner. The nature of my invention consists in placing the whole tomatoes, either peeled or unpeeled, in an air-tight vessel together with liquid from other tomatoes, to which liquid salt, pepper, and alum are added to preserve and harden the raw tomatoes.

In order to enable others skilled in the art to which my invention appertains to make and use the same, I will now proceed to describe the manner in which I carry out my process.

The raw tomatoes, either peeled or unpeeled, are placed in a vessel of tin, glass, or other suitable material. The liquid of other tomatoes is placed in this vessel with the whole ones to preserve their flavor, and to the liquid is added a small quantity of salt and pepper to preserve the tomatoes, and a small quantity of alum, or other equivalent substance, to harden them. The can or vessel is sealed and steamed for a certain length of time—say about five or ten minutes—and is then ready for shipment.

In the annexed drawing I have represented a glass jar and a tin can for holding the tomatoes. The jars A are intended mainly for family use, though the cans B may also be used for the same. The can B is provided with a bail, C, so that it can be hung up, which is especially desireable on board of ships, as thereby any injury to the tomatoes by bruising or jamming is avoided. For hotels, steamboats, &c., where large quantities are used, the tomatoes may be preserved in a large tin or glass vessel, covered with willow or other packing, so that when empty the vessel may be returned and refilled, thus saving the cost of vessels, the fruit only being charged for.

Tomatoes thus prepared may be eaten raw or cooked in any desired manner, out of season.

Having thus fully described my invention, what I claim as new, and desire to secure by Letters Patent, is—

1. The process for preserving tomatoes whole by placing them in an air-tight can, and subjecting the filled can to the action of steam, as set forth.

2. Preserving tomatoes whole by first placing them in a can, placing therein liquid of tomatoes, salt and pepper, and a small quantity of alum, or equivalent substance, and then steaming the filled can, substantially as set forth.

In testimony that I claim the foregoing I have hereunto set my hand this 11th day of October, 1872.

FREDERIC G. FORD.

Witnesses:
 C. L. EVERT,
 A. N. MARR.